United States Patent [19]

Drewitz

[11] Patent Number: 5,662,208
[45] Date of Patent: Sep. 2, 1997

[54] CONVEYOR WITH RETRACTABLE FLAPS FOR TRANSPORTING CONTAINERS

[75] Inventor: Hugues Drewitz, St-Eustache, Canada

[73] Assignee: H.G. Kalish Inc., Canada

[21] Appl. No.: 474,154

[22] Filed: Jun. 7, 1995

[51] Int. Cl.⁶ .................................................. B65G 15/44
[52] U.S. Cl. ........................... 198/550.7; 198/697
[58] Field of Search ................... 198/697, 550.7

[56] References Cited

U.S. PATENT DOCUMENTS

| 359,154 | 3/1887 | Howard . | |
|---|---|---|---|
| 672,953 | 4/1901 | Moldenhauer . | |
| 1,516,967 | 11/1924 | Johnson | 198/697 X |
| 1,620,268 | 3/1927 | McVicker . | |
| 1,673,559 | 6/1928 | Hanak | 198/697 |
| 1,978,099 | 10/1934 | Baker . | |
| 1,984,826 | 12/1934 | Bunker | 198/697 X |
| 2,359,316 | 10/1944 | Kroll, Sr. | 198/697 X |
| 2,570,065 | 10/1951 | Melroe | 198/697 X |
| 3,233,721 | 2/1966 | Redden . | |
| 3,265,188 | 8/1966 | Redden . | |
| 3,805,420 | 4/1974 | Crum . | |
| 3,866,738 | 2/1975 | Aterianus . | |
| 4,055,265 | 10/1977 | Eisenman . | |
| 4,232,782 | 11/1980 | Ikeda et al. . | |
| 4,741,431 | 5/1988 | Whitehead . | |
| 4,770,287 | 9/1988 | Glowatzki . | |
| 4,796,748 | 1/1989 | Manning . | |
| 5,058,729 | 10/1991 | Shibata . | |
| 5,186,233 | 2/1993 | Obata et al. . | |

FOREIGN PATENT DOCUMENTS

| 66684 | 8/1957 | France | 198/697 |
|---|---|---|---|
| 342130 | 10/1921 | Germany | 198/550.7 |

*Primary Examiner*—D. Glenn Dayoan
*Attorney, Agent, or Firm*—Larson and Taylor

[57] ABSTRACT

The invention relates to a conveyor system for transporting containers. The conveyor system is made of an endless belt to which are mounted pivotable flaps having abutments to limit their pivotal movement beyond a predetermined angle when the belt is travelling in a generally upward direction so as to form pockets for transporting containers to the top of the conveyor. When the flaps reach the top portion of the conveyor, they pivot under the effect of gravity to a retracted position where they lay flat against the belt thereby allowing the containers in the pockets to be discharged while providing sufficient clearance for the belt to be in close proximity with a chute which receives the containers. The conveyor of the present invention can thus function effectively in a generally vertical position and is thus more space efficient.

11 Claims, 3 Drawing Sheets

CONVEYOR WITH RETRACTABLE FLAPS FOR TRANSPORTING CONTAINERS

FIELD OF THE INVENTION

The present invention relates to a conveyor with retractable flaps particularly well suited for transporting containers in bulk.

BACKGROUND TO THE INVENTION

Automatic packaging installations usually comprise a conveyor transporting containers between processing stations, such as a cleaning station, a filling station, a caping station, a labelling station, etc. Prior art packaging installations make use primarily of horizontal conveyors that are relatively inexpensive and simple. Their major drawback however, is that they occupy a significant amount of floor space.

In particular, one of the stations which requires an important amount of floor space is the combination of a bin and its associated conveyor for feeding empty containers via chute to an apparatus that will sort the randomly oriented containers and arrange them in a neck-up position so they can be filled.

OBJECT OF THE INVENTION

An object of the present invention is a conveyor system, particularly well suited for transporting containers, which occupies a reduced amount of floor space.

SUMMARY OF THE INVENTION

As embodied and broadly described herein, the invention provides a conveyor system, comprising:

a) an endless belt having a first run travelling in a first generally upward direction and a second run travelling in a second generally downward direction;

b) a plurality of flaps mounted to said endless belt in a spaced apart relationship, each flap being capable of moving between an extended condition and a retracted condition, in said extended condition the flap projecting a predetermined distance from said belt to form a carrying pocket capable of holding material to be transported by said endless belt, in said retracted position said carrying pocket being collapsed, the flap being capable of moving between said extended condition and said retracted condition under the effect of gravity, whereby when the flap travels on said first run it acquires said extended condition and when the flap is in said second run it acquires said retracted condition.

In a preferred embodiment, each flap is pivotally mounted to the endless belt. In the retracted condition i.e., when the flap is on the downward run, it lays flat against the belt to clear the receptacle. During the upward run, the flap pivots under the effect of gravity until it reaches the extended condition. To stop the pivotal movement of the flap once the extended condition has been reached, a arresting flange is provided on the flap which abuts the surface of the endless belt.

In a preferred embodiment, there is also provided a receptacle, such as a chute, for receiving material transported by the endless belt, the receptacle being located at a distance from the second run that is less than the distance at which the flaps project from the conveyor belt when they are extended. Thus, the ability of the flaps to retract allows to locate the receptacle close to the conveyor to avoid containers passing between the chute and the conveyor belt.

As embodied and broadly described herein, the invention also provides a conveyor system comprising:

a) an endless belt having a first run travelling in a first generally upward direction and a second run travelling in a second generally downward direction;

b) a plurality of flaps, each flap comprising a top surface and a bottom surface, said flap further comprising a first end pivotally mounted to said endless belt, said flap also comprising an abutment projecting beyond said bottom surface, said abutment being adjacent a mounting point of said flap to said endless belt, whereby when said flap travels on said first run said abutment limits pivoting of said flap, whereby said flap defines a carrying pocket with said belt and whereby when said flap travels on said second run, said flap pivots so as to lay substantially against said endless belt.

DETAILED DESCRIPTION OF A PREFERRED EMBODIMENT

Figure 1:
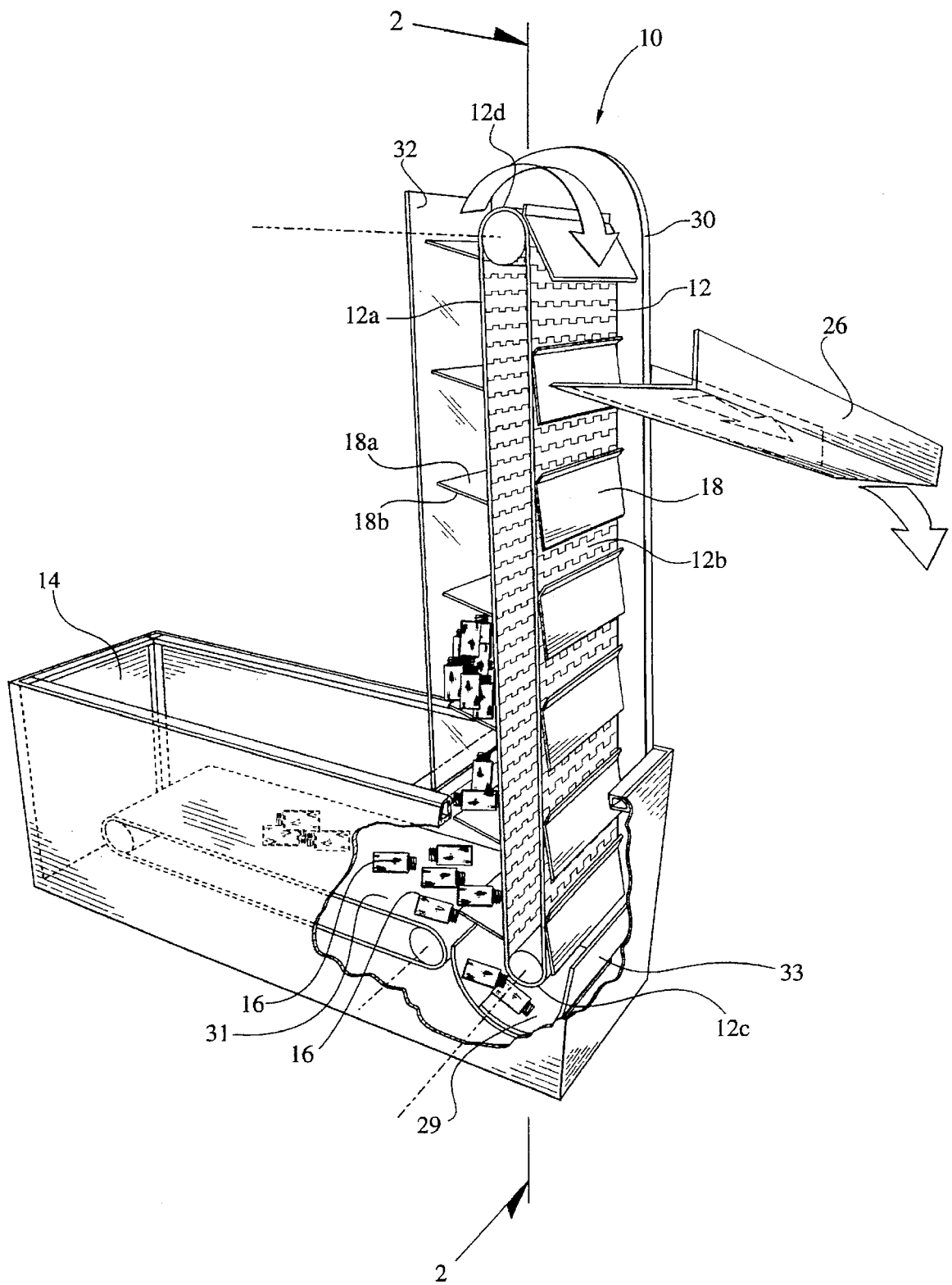
FIG. 1 is a perspective view of a conveyor system in accordance with the invention.

The conveyor system of the present invention is particularly well suited to carry containers from a storage bin to a receptacle, such as a chute which directs the containers to a processing station, such as a device that will sort the randomly oriented containers and arrange them in a neck-up position so they can be filled.

With reference to the annexed drawings the conveyor system, generally referred to at 10, comprises an endless belt 12 having an upwardly extending run 12a and a downwardly extending run 12b. The lower section 12c of the endless belt is located in a storage bin 14 where empty containers 16 are stored in bulk. Flaps 18 having top surfaces 18a and bottom surfaces 18b are pivotally mounted to the belt 12 by means of transverse hinges 15 secured to the belt 12 by an appropriate means. Preferably, the flaps 18 are mounted to the belt 12 at equidistant intervals.

Figure 2:
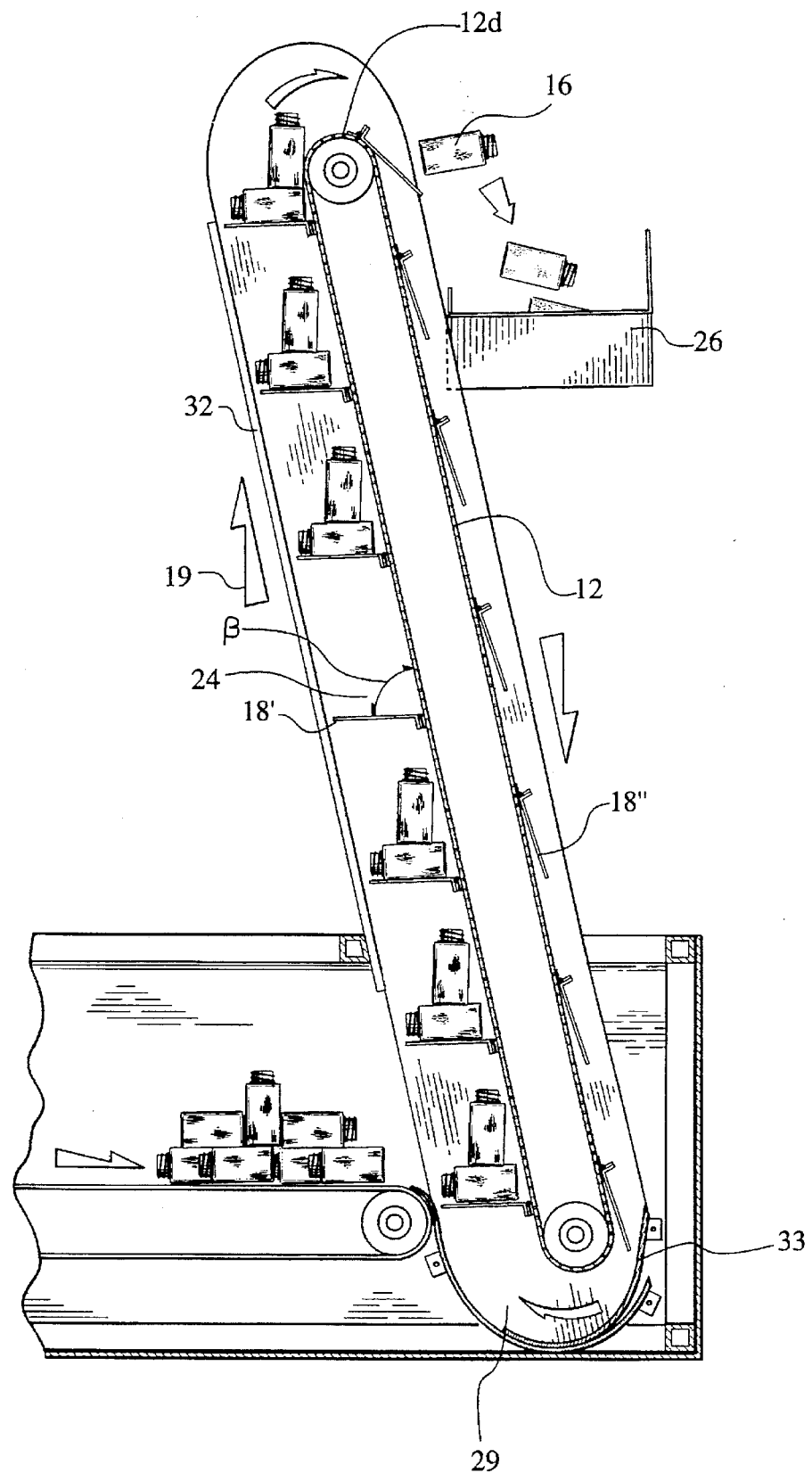
FIG. 2 is a cross-sectional view taken along lines 2—2 of FIG. 1.
Figure 3:
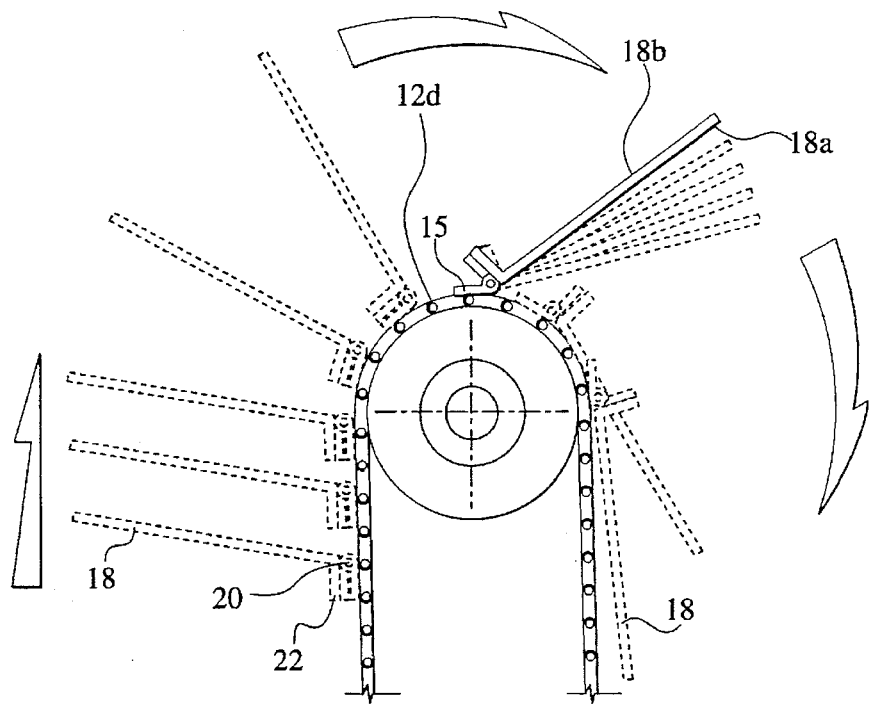
FIG. 3 is side view of the top portion of the conveyor belt illustrating the retraction movement of a flap when it travels downwardly.
Figure 4:
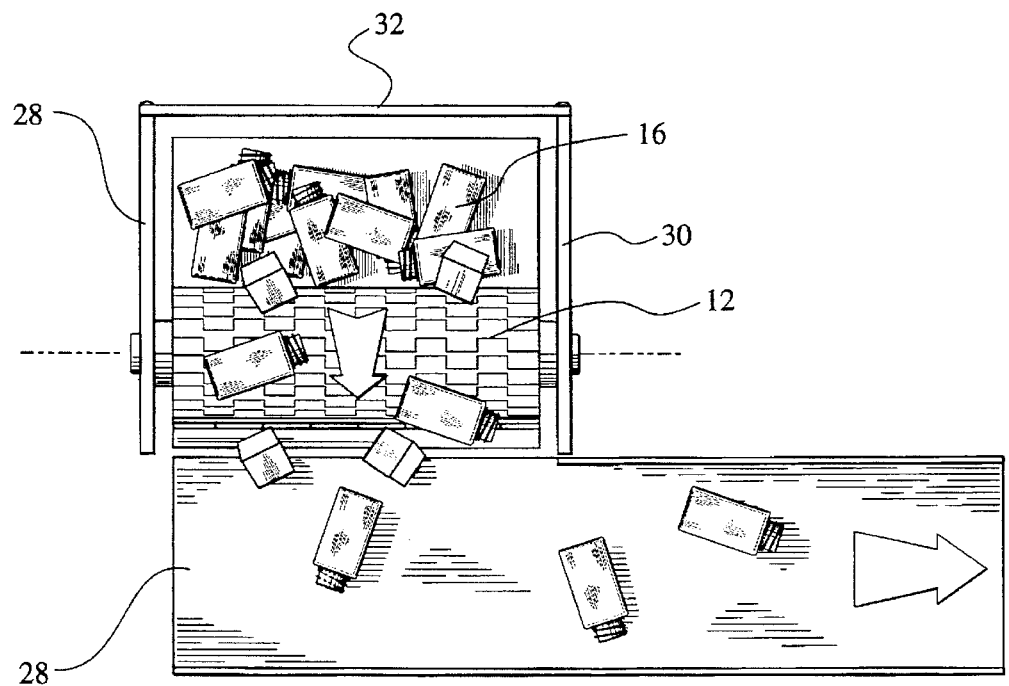
FIG. 4 is a top plan view of the conveyor illustrating the position of the endless belt and of a chute.

As best shown in FIG. 3, a flange 22 projects from the bottom surface 18b of each flap 18 to form an abutment which limits the pivoting of the flap beyond a predetermined angle β (see also FIG. 2). The flaps 18 on the upward run of the conveyor pivot downwardly under the effect of gravity to an extended position in which the flanges 22 abut the belt 12. In the extended position the flaps 18 define container carrying pockets 24 that can hold and elevate empty containers 16 from the bin 14 as the endless belt 12 advances. To prevent the containers 16 from rolling and falling off the flaps 18, the flaps are at an angle (angle β) less than 90 degrees. This arrangement stabilises the containers 16 as they have a natural tendency to roll toward the belt 12 where they are least likely to fall off.

Referring back to FIG. 3, it will be seen that when a flap 18 reaches the top portion 12d of the belt 12, it initiates its downward run, and pivots under the effect of gravity to a retracted position where it lays flat against the surface of the belt. In this retracted position, the container holding pocket formed by the flap collapses and the containers 16 fall under the effect of gravity on a receptacle 26 which is in the form of a chute. The chute 26 is located very close to the surface of the belt 12 to avoid the possibility of containers passing or becoming wedged between the surface of the belt 12 and the chute 26. This is made possible by the fact that the flap 18, when in the retracted position projects from the surface of the belt 12 only by a small distance.

The chute 26 is an inclined surface on which the containers 16 roll under the effect of gravity toward the processing station (not shown in the drawings) supplied with containers from the storage bin 14.

As shown in FIG. 2, the conveyor system of the present invention can be backwardly inclined toward the bin so as to avoid the chute 26 from projecting substantially beyond the left side of the bin 14. This results into a very compact design having a transverse extend which remains within the dimensions of the bin. As such, the conveyor makes use of the space immediately above the bin, rather than projecting laterally from the bin. This enables to locate other equipment very close to the bin 14 without interfering with the operation of the conveyor system.

The bottom portion of the storage bin is provided with a recessed portion 29 providing enough clearance for the flaps 18 to undergo the transition from the retracted position to the extended position. This feature allows the conveyor to be deeply nested in the bin 14 so the container holding pockets deploy at a level flush or even below the bottom surface of the bin. As a result, the conveyor can pick-up containers resting in the recess 29 of the bin 14. In order to prevent bottles from falling to far back in the recess and being damaged by the flaps, there is provided a guide rail 33 of flexible material such as plastic. The guide rail 33 substantially closes the recess 29 on the downward run side of the conveyor, leaving enough space for the flaps in a folded position to pass. To further assist the conveyor 12 to empty the bin 14 more completely, a secondary horizontal conveyor 31 is provided at the bottom of the bin 14 which transports containers into the recess 29 where they are picked-up by the flaps.

As a further measure of precaution against the fall of containers from the container carrying pockets 24, a cage is built around the conveyor 12 to provide three stationary walls that prevent the containers from egressing their respective pockets. The cage comprises opposite side walls 28 and 30 and a front wall 32 facing the upward run 12a. These walls can be made of any suitable materials and most preferably, the front wall 32 is transparent to allow the operator of the machine to perform visual inspections. The cage terminates immediately after the flaps 18 initiate the downward run, so the containers 16 can be allowed to escape toward the chute 26.

The above description of a preferred embodiment should not be interpreted in any limiting manner since variations and refinements are possible which are within the spirit and scope of the present invention. The scope of the invention is defined in the appended claims and their equivalents.

I claim:

1. A conveyor system, comprising:
   a) an endless belt having a first run travelling in a first generally upward direction and a second run travelling in a second generally downward direction;
   b) a plurality of flaps mounted to said endless belt in a spaced apart relationship, each flap being movable between an extended condition and a retracted condition, in said extended condition the flap projecting a certain distance from said belt to form a carrying pocket capable of holding material to be transported by said endless belt, in said retracted condition said carrying pocket being collapsed, the flap being angularly movable in a downward direction between said extended condition and said retracted condition for causing said pocket to collapse and allow material therein to be discharged, the flap acquiring said extended condition on said first run and acquiring said retracted condition on said second run; and
   c) a receptacle for receiving material transported by said endless belt, said receptacle being located at a distance from said second run that is less than said certain distance.

2. A conveyor system as defined in claim 1 comprising a cage extending along at least a portion of said first run to prevent containers from egressing the carrying pockets.

3. A conveyor system as defined in claims 2, wherein said cage includes a pair of generally opposite side walls providing therebetween a pathway for the flaps travelling on said first run, and a front wall extending between said side walls.

4. A conveyor system as defined in claim 3, wherein said front wall is transparent.

5. A conveyor system as defined in claim 1 further comprising a storage bin for supplying containers to said carrying pockets, said endless belt being mounted in said storage bin.

6. A conveyor system as defined in claim 5 wherein said storage bin comprises a recessed portion allowing said flaps to undergo transition from said retracted condition to said extended condition.

7. A conveyor system as defined in claim 6 further comprising a secondary conveyor extending along a bottom surface of said storage bin for feeding containers to the container carrying pockets.

8. A conveyor system as defined in claim 1, wherein said flaps are pivotally mounted to said endless belt.

9. A conveyor system as defined in claim 8, wherein each flap comprises an abutment capable of engaging said endless belt to limit the pivotable movement of the flap on said endless belt.

10. A conveyor system, comprising:
    a) an endless belt having a first run travelling in a first generally upward direction and a second run travelling in a second generally downward direction; and
    b) a plurality of flaps, each flap comprising a top surface and a bottom surface, each of said flaps further comprising a first end pivotally mounted to said endless belt and an abutment projecting beyond said bottom surface and being adjacent to a mounting point of the respective flap to said endless belt, said abutment limiting pivoting of said flap when said flap travels on said first run, said flap defining a carrying pocket with said belt when said flap travels on said second run, said flap pivoting downwardly, under the effect of gravity, to a position in which it lays substantially flat against said endless belt for causing discharge of material from said pocket.

11. A conveyor system for transporting containers, comprising:
    a) an endless belt having a first run travelling in a first generally upward direction and a second run travelling in a second generally downward direction;
    b) a plurality of flaps mounted to said endless belt in a spaced apart relationship, each of said flaps being movable between an extended condition and a retracted condition, in said extended condition the flaps being at an angle of less than 90 degrees with relation to said first run and projecting a certain distance from said belt to form a carrying pocket capable of holding a container transported by said endless belt, in said retracted condition said carrying pocket being collapsed, the flap being angularly movable in a downward direction under the effect of gravity, between said extended condition and said retracted condition, for causing said pocket to collapse and thus discharge the container therefrom; and c) a receptacle for receiving a container transported by said endless belt, said receptacle being located at a distance from said second run that is less than said certain distance.

* * * * *